Patented Jan. 16, 1940

2,187,703

UNITED STATES PATENT OFFICE 2,187,703

BARBITURIC ACIDS

Arthur C. Cope, Bryn Mawr, Pa., assignor to Sharp & Dohme, Incorporated, Philadelphia, Pa., a corporation of Maryland No Drawing. Application March 23, 1939, Serial No. 263,807

5 Claims. (Cl. 260—257)

This invention relates to new barbituric acid derivatives which have outstanding advantages for therapeutic purposes. It relates more particularly to 5-alkyl 5-(1-methyl-$\Delta_1$-butenyl) barbituric acids, in the form of free acids or salts, in which the alkyl group is a hydrocarbon group having from one to three carbon atoms. These new compounds may be represented by the structural formula

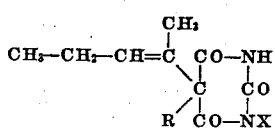

in which R represents a hydrocarbon alkyl group having from one to three carbon atoms, and in which X represents hydrogen or an alkali metal, the ammonium radical, an equivalent of an alkaline earth metal, a primary, secondary or tertiary amine, such as a mono-, di-, or tri-alkylamine, or other salt forming radical or base.

The new compounds of the present invention are particularly valuable pharmacologically as sedatives, hypnotics, soporifics, etc., or, more broadly, as sleep inducing agents. Extensive pharmacological tests have demonstrated that, as compared with barbituric acid compounds now widely used, these new barbituric acid derivatives have a high therapeutic ratio, that is, ratio of effective dose to lethal dose; a decreased tendency to reduce blood pressure, that is, the new compounds produce a smaller fall in blood pressure than do barbituric acid derivatives now widely used; a more purely narcotic action, that is, they depress the higher nerve centers more and the vegetative centers less; and produce no organic deterioration even after long-continued administration.

Particularly important in the new group of barbituric acids of the present invention are 5-methyl 5-(1-methyl-$\Delta_1$-butenyl) barbituric acid, 5-ethyl 5-(1-methyl-$\Delta_1$-butenyl) barbituric acid, and 5-n-propyl 5-(1-methyl-$\Delta_1$-butenyl) barbituric acid, in the form of free acids or salts, particularly the sodium salts. The invention also includes the 5-isopropyl and 5-allyl compounds. These compounds may be prepared in various ways. An advantageous method is by the condensation of the corresponding cyanoacetic acid esters with urea or guanidine. The intermediate products, that is, the cyanoacetic acid esters corresponding to the desired barbituric acids may be prepared by condensation of methyl propyl ketone with cyanoacetic ester, advantageously as described in application Serial No. 149,139, filed June 19, 1937, with subsequent alkylation of this intermediate alkylidene compound by treatment of the alkylidene compound with an alkyl salt, such as an alkyl halide, in the presence of a suitable isomerization agent, as described in Patent No. 2,119,526. Advantageously, the condensation of the cyanoacetic acid ester and the urea or guanidine is carried out in absolute isopropyl alcohol, although it may be carried out in other solvents, such as absolute alcohol.

The production of the new products will be illustrated by the following specific examples, although it is not limited thereto.

*Example 1.*—6.9 parts of sodium are dissolved in 100 parts of absolute ethyl alcohol in a vessel provided with a reflux condenser. After the sodium is dissolved, 9.6 parts of urea and 20.9 parts of the ethyl ester of ethyl (1-methyl-$\Delta_1$-butenyl) cyanoacetic acid are added. The mixture is refluxed for twelve hours, after which the alcohol is removed by vacuum distillation and the residue is dissolved in 100 parts of water. The resulting solution is extracted with ether in three successive 25 part portions. The nitrile which is formed as a by-product from the cyanoacetate used is recovered from the ether extract by washing with water, evaporating the ether and distilling. The combined water solutions, containing 5-ethyl 5-(1-methyl-$\Delta_1$-butenyl) 4-imino barbituric acid, are acidified until acid to Congo red with concentrated hydrochloric acid, after which the mixture is transferred, if necessary, to another vessel, and an equal volume of concentrated hydrochloric acid is added. The solution is then refluxed for one hour to hydrolyze the imino compound. The 5-ethyl 5-(1-methyl-$\Delta_1$-butenyl) barbituric acid crystallizes out on cooling. It is filtered and washed with two 25 part portions of ice water. By this process, 8 parts of the crude product (35% yield) have been obtained. After two crystallizations from 50% alcohol, the yield of the purified product is 6.5 parts (29%). The product melts at 160–162° C.

*Example 2.*—46 parts of sodium are dissolved in 1000 parts of absolute isopropyl alcohol in a suitable vessel provided with a reflux condenser containing a drying tube. After solution is complete, 96 parts of urea (dried at 100° C.) and 209 parts of the ethyl ester of ethyl (1-methyl-$\Delta$:-butenyl) cyanoacetic acid are added. The resulting mixture is refluxed on an oil bath at 105° C. for twelve hours. It is then cooled slightly and the isopropyl alcohol is removed in vacuo, using a still head and heating on a hot water bath. The residue is dissolved in 1000 parts of water, and is extracted with two successive 100 part portions of ether. The ether extracts are washed with two 50 part portions of water. The resulting water solutions are combined, and acidified until acid to Congo red with concentrated hydrochloric acid. The solution is placed in a vessel provided with a still head and an equal volume of concentrated hydrochloric acid is added and the solution is refluxed for two hours to hydrolyze the imino compound. During this refluxing, about one-fourth of the original volume is allowed to distill out to remove any ether or alcohol present and to insure a 20% hydrochloric acid concentration. The 5-ethyl 5-(1-methyl-$\Delta_1$-butenyl) barbituric acid separates after ten-thirty minutes of refluxing. The mixture is cooled, filtered, and the separated product is washed with two 100 part portions of ice water. About 116–121 parts of the crude product (52–54% yield) are obtained. After recrystallization from 600 parts of 50% alcohol, about 105–110 parts of the 5-ethyl 5-(1-methyl-$\Delta_1$-butenyl) barbituric acid, M. P. 160–162° C. (47–49% yield) are obtained.

Example 3.—82.8 parts of sodium are dissolved in 1300 parts of absolute ethyl alcohol by refluxing in a suitable vessel provided with a stirrer and a reflux condenser containing a drying tube. 144 parts of guanidine carbonate, (dried at 100° C.) are added and the mixture is stirred and refluxed on an oil bath at 105–110° C. for about five minutes. 209 parts of ethyl (1-methyl-$\Delta_1$-butenyl) cyanoacetic acid ethyl ester are added dropwise to the mixture which is stirred and kept refluxing on the oil bath at 105° C. The addition of the ester requires about thirty minutes. The reaction is vigorous. The mixture is refluxed on the oil bath at 105° C. for twelve hours, advantageously with stirring. The alcohol is removed under reduced pressure, using a still head and heating the reaction vessel on a hot water bath. 1000 parts of water are added to the residue, the mixture is transferred to a suitable vessel and acidified with hydrochloric acid until acid to Congo red. An equal volume of concentrated hydrochloric acid is then added, a still head is attached to the vessel and the solution is refluxed for six hours to hydrolyze the imino barbituric acid. During the refluxing, about one-fourth of the original volume is distilled out to remove any alcohol and nitrile present and to insure a 20% hydrochloric concentration. After about five minutes of refluxing an insoluble imino barbituric acid separates. This product slowly dissolves and the desired 5-ethyl 5-(1-methyl-$\Delta_1$-butenyl) barbituric acid begins to separate after one and one-half hours of refluxing. The mixture is then cooled, the crude product is filtered out and washed with two 100 part portions of ice water. 140 parts of the crude product (63% theoretical yield) is obtained. It is recrystallized from 1000 parts of 50% alcohol and the final yield of the pure product, M. P. 160–162° C., is 120 parts (53% theoretical yield).

Example 4.—5-methyl 5-(1-methyl-$\Delta_1$-butenyl) barbituric acid is produced by condensing urea with the mixed ethyl and isopropyl esters of methyl (1-methyl-$\Delta_1$-butenyl) cyanoacetic acid in isopropyl alcohol following the procedure of Example 2. The product is obtained in about 43% yield. Its melting point is 157.5–158.5° C.

Example 5.—5-n-propyl 5-(1-methyl-$\Delta_1$-butenyl) barbituric acid is prepared by the condensation of urea with the ethyl ester of the corresponding cyanoacetic acid in isopropyl alcohol following the procedure of Example 2, and using approximately the same molar ratios. The product is obtained in about 41–42.5% yield. It melts at 128–130° C.

Example 6.—5-isopropyl 5-(1-methyl-$\Delta_1$-butenyl) barbituric acid is prepared by condensing urea with the ethyl ester of isopropyl (1-methyl-$\Delta_1$-butenyl) cyanoacetic acid in isopropyl alcohol, following the procedure of Example 2. The product is obtained in about 12% yield. It melts at 120–120.5° C.

Example 7.—The sodium salt of 5-ethyl 5-(1-methyl-$\Delta_1$-butenyl) barbituric acid is prepared by dissolving 23 parts of sodium in 350 parts of absolute alcohol in a vessel provided with a reflux condenser containing a drying tube, and adding the resulting solution to a solution of 224 parts of 5-ethyl 5-(1-methyl-$\Delta_1$-butenyl) barbituric acid dissolved in 300–400 parts of absolute alcohol. The resulting solution is concentrated in vacuo, with heating on a warm water bath. About 200 parts of dry benzene are then added and the mixture is again concentrated. If this evaporation is carried out to an extent such that all of the solvent is removed, no further washing is required. If all of the solvent is not removed by evaporation, the residue is washed with dry ether. The resulting sodium salt is then dried in an oven at 90° C. and then is dried in vacuo (2 mm.) at 78° C. The yield is 97–99%.

Where, in the foregoing examples, the ethyl or mixed ethyl and isopropyl esters of cyanoacetic acids are used, other alkyl esters, such as the pure isopropyl esters, may, of course, be used instead, with approximately the same results.

Example 8.—The sodium salt of 5-n-propyl 5-(1-methyl-$\Delta_1$-butenyl) barbituric acid is prepared from the barbituric acid and sodium ethoxide solution by the procedure of Example 7. It is obtained in 99–100% yield.

Other salts than the sodium salt may, of course, be prepared in similar fashion, and are included in the invention which includes the new barbituric acids whether in the form of free acids or salts. Included among the salts which may be prepared are the salts with sodium, potassium, other alkali metals, alkaline earth metals, ammonia, primary, secondary and tertiary amines, particularly the mono-, di- and tri-alkyl amines, etc.

The new barbituric acids thereof have outstanding pharmacological properties. In the following table are shown the results of pharmacological tests on mice with 5-methyl, 5-ethyl, 5-propyl and 5-isopropyl 5-(1-methyl-$\Delta_1$-butenyl) barbituric acids. Dosages given are calculated as free acid, although administration was of the sodium salts. The first column shows the derivative, the second column the method of administration, that is, whether intraperitoneal or oral, the third column the dosage in milligrams per kilogram required to anaesthetize 50% of the mice, the fourth column the dosage required to anaesthetize 100% of the mice, the fifth column the dosage required to kill 50% of the mice, the sixth column the ratio of the dosage required to kill 50% to the dosage required to anaesthetize 50%, an important therapeutic ratio, the seventh column the induction period, that is, the period required for anaesthesia to take place after administration in minutes, and the last column the duration of anaesthesia in hours.

Table I

| Derivative | Adm. | AD50 | AD100 | LD50 | LD50/AD50 | Periods* Induction, minutes | Anaesthesia, hours |
|---|---|---|---|---|---|---|---|
| Methyl | IP | 130 | 140 | 500 | 3.8 | 16 | 1.0 |
| | Oral | 220 | 240 | 600 | 2.7 | 16 | 7.0 |
| Ethyl | IP | 50 | 60 | 180 | 3.6 | 9 | 0.4 |
| | Oral | 55 | 80 | 190 | 3.5 | 6 | 2.0 |
| Propyl | IP | 65 | 70 | 270 | 4.1 | 7 | 0.3 |
| | Oral | 80 | 100 | 320 | 4.0 | 4 | 0.5 |
| Iso-propyl | IP | 25 | 30 | 100 | 4.0 | 4 | 0.3 |
| | Oral | 35 | 40 | 120 | 3.4 | 3 | 1.0 |

*At AD100.

The following table shows the results of similar tests on rats, the columns having the same significance.

Table II

| Derivative | Adm. | AD50 | AD100 | LD50 | LD50/AD50 | Periods Induction, minutes | Anaesthesia, hours |
|---|---|---|---|---|---|---|---|
| Methyl | Oral | 80 | 100 | 320 | 4.0 | 21 | 3.0 |
| Ethyl | do | 25 | 40 | 100 | 4.0 | 9 | 2.0 |
| Propyl | do | 40 | 60 | 210 | 5.3 | 5 | 2.5 |

The following table shows the results of similar tests on dogs. The first two columns have the same significance, the third column represents the minimum effective dose in milligrams per kilogram, the fourth column the minimum lethal dose in milligrams per kilogram, the fifth column the ratio of the minimum lethal dose to the minimum effective dose, and the last two columns have the same significance as the last two columns in the foregoing tables.

Table III

| Derivative | Adm. | MED | MLD | Ratio | Periods Induction, minutes | Anaesthesia, hours |
|---|---|---|---|---|---|---|
| Methyl | Oral | 80 | 260 | 3.2 | 80 | 7.0 |
| Ethyl | do | 20 | 70 | 3.5 | 85 | 3.0 |
| Do | Intravenous | 20 | 80 | 4.0 | 5 | 2.0 |
| Propyl | Oral | 25 | 100 | 4.0 | 70 | 2.0 |
| Do | Intravenous | 20 | 80 | 4.0 | 4 | 3.0 |

From the foregoing tables, it will be apparent that the compounds of the present invention are effective in small dosages and have a high therapeutic ratio, which in effect is a high margin of safety. As previously pointed out, the new compounds also have other important advantages for therapeutic uses which are not apparent from the foregoing tables. These are illustrated by the following tests, in which two of the new compounds were compared with two well-known and widely used barbituric acids.

5-ethyl 5-(1-methyl-$\Delta_1$-butenyl) barbituric acid and 5-propyl 5-(1-methyl-$\Delta_1$-butenyl) barbituric acid, when administered intravenously to dogs under chloralose anaesthesia produced a smaller fall in blood pressure than does either 5-ethyl 5-isoamyl barbituric acid or 5-ethyl 5-(1-methylbutyl) barbituric acid. The same four compounds were administered intraperitoneally to decerebrate dogs and the effect on the respiratory center was determined by measuring the response of the respiration to stimulation by carbon dioxide before and after such administration. The order of increasing effectiveness in destroying the response of the respiratory center to carbon dioxide stimulation was: 5-ethyl 5-(1-methyl-$\Delta_1$-butenyl) barbituric acid and 5-propyl 5-(1-methyl-$\Delta_1$-butenyl) barbituric acid (which have about the same effect), 5-ethyl 5-(1-methyl-butyl) barbituric acid and 5-ethyl 5-isoamyl barbituric acid. This test shows that the two new compounds do not have as great an effect on the vegetative centers as do the two known compounds. In other words, the new compounds are more purely narcotic in action, depressing the higher nerve centers more and the vegetative centers less. As death from over-dosage of barbiturates is generally due to respiratory failure, the importance of this advantage of the new compounds will be appreciated. The same two new compounds, that is, 5-ethyl 5-(1-methyl-$\Delta_1$-butenyl) barbituric acid and 5-propyl 5-(1-methyl-$\Delta_1$-butenyl) barbituric acid were administered as the sodium salts every other day during a period of from 70 to 100 days to groups of rats and dogs. The animals were then killed and histological examination made. All of the animals were normal, showing that these compounds caused no organic deterioration on long-continued administration. During these tests, the dogs developed no tolerance to either of the compounds. The rats developed no tolerance to the 5-ethyl compound, but did develop a tolerance to the 5-propyl compound, as about twice the original minimum anaesthetic dose was required to produce sleep at the end of the 70 to 100 day period.

It will thus be understood that by the present invention there is provided a new group of barbituric acid derivatives which have important and outstanding advantages for therapeutic uses as sleep producing agents, i. e., as anaesthetics, hypnotics, soporifics or sedatives.

The term "isomerization agent" employed herein is intended to cover an agent capable of promoting the shifting of the double bond uniting the alkylidene group and the cyanoacetic ester group to the $\Delta_1$ position whereupon the alkylidene group is changed to the corresponding alkenyl group.

I claim:

1. 5-alkyl 5-(1-methyl-$\Delta_1$-butenyl) barbituric acids in which the alkyl group has from one to three carbon atoms.

2. 5-methyl 5-(1-methyl-$\Delta_1$-butenyl) barbituric acid.

3. 5-ethyl 5-(1-methyl-$\Delta_1$-butenyl) barbituric acid.

4. 5-propyl 5-(1-methyl-$\Delta_1$-butenyl) barbituric acids.

5. 5-n-propyl 5-(1-methyl-$\Delta_1$-butenyl) barbituric acid.

ARTHUR C. COPE.